United States Patent
Åberg et al.

(10) Patent No.: US 9,417,141 B2
(45) Date of Patent: Aug. 16, 2016

(54) FORCE SENSITIVE TOUCH SENSOR

(75) Inventors: Peter Åberg, Vinslöv (SE); Gunnar Klinghult, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 107 days.

(21) Appl. No.: 14/342,379

(22) PCT Filed: Sep. 16, 2011

(86) PCT No.: PCT/EP2011/004655
§ 371 (c)(1),
(2), (4) Date: Mar. 20, 2014

(87) PCT Pub. No.: WO2013/037385
PCT Pub. Date: Mar. 21, 2013

(65) Prior Publication Data
US 2014/0216174 A1    Aug. 7, 2014

(51) Int. Cl.
| | |
|---|---|
| *G01L 1/04* | (2006.01) |
| *G01L 1/18* | (2006.01) |
| *G06F 3/041* | (2006.01) |
| *G06F 3/042* | (2006.01) |
| *G06F 3/044* | (2006.01) |
| *G01L 1/14* | (2006.01) |

(52) U.S. Cl.
CPC ... G01L 1/18 (2013.01); G01L 1/14 (2013.01); G06F 3/041 (2013.01); G06F 3/044 (2013.01); G06F 3/0414 (2013.01); G06F 3/0421 (2013.01)

(58) Field of Classification Search
CPC ........ G01L 1/2262; G01L 1/2231; G01L 3/24
USPC ............ 73/862, 862.628, 862.627, 862.625, 73/862.621, 862.381
See application file for complete search history.

(56) References Cited

U.S. PATENT DOCUMENTS

| | | | |
|---|---|---|---|
| 2008/0048996 A1 | 2/2008 | Hu et al. | |
| 2009/0085894 A1 | 4/2009 | Gandhi et al. | |
| 2010/0123686 A1* | 5/2010 | Klinghult | G06F 3/0412 345/178 |
| 2010/0200839 A1 | 8/2010 | Okai et al. | |
| 2010/0201635 A1* | 8/2010 | Klinghult | G06F 3/0414 345/173 |

(Continued)

FOREIGN PATENT DOCUMENTS

| | | |
|---|---|---|
| CN | 101859858 | 10/2010 |
| WO | 2010091744 | 8/2010 |

(Continued)

OTHER PUBLICATIONS

International Search Report and Written Opinion from corresponding International Application No. PCT/EP2011/004655, mailed on Dec. 21, 2011.

*Primary Examiner* — Lisa Caputo
*Assistant Examiner* — Nigel Plumb
(74) *Attorney, Agent, or Firm* — Renner, Otto, Boisselle & Sklar, LLP.

(57) ABSTRACT

A force sensitive touch sensor (100) is provided. The sensor (100) comprises an insulating support layer (101) and an electrically conductive sensor structure (102). The electrically conductive sensor structure (102) comprises a piezoresistive material and is configured to provide a resistance varying in response to a force being applied to the insulating support layer (101). The piezoresistive material comprises graphene.

10 Claims, 2 Drawing Sheets

(56) References Cited

U.S. PATENT DOCUMENTS

| | | |
|---|---|---|
| 2011/0006837 A1 | 1/2011 | Wang et al. |
| 2011/0041980 A1 | 2/2011 | Kim et al. |
| 2011/0129675 A1 | 6/2011 | Choi et al. |
| 2011/0163298 A1* | 7/2011 | Sung ................. G03H 1/02 257/29 |
| 2011/0175060 A1* | 7/2011 | Okai ................. B82Y 40/00 257/29 |

FOREIGN PATENT DOCUMENTS

| | | |
|---|---|---|
| WO | 2011010484 | 1/2011 |
| WO | 2011025216 | 3/2011 |

* cited by examiner

FORCE SENSITIVE TOUCH SENSOR

FIELD OF THE INVENTION

The present application relates to a sensor comprising an insulating support layer and an electrically conductive sensor structure which is configured to provide a resistance varying in response to a force applied to the sensor. The present application relates especially to a sensor in which the electrically conductive sensor structure comprises a graphene. The present application relates furthermore to a display and a touch sensitive user interface comprising the force sensitive touch sensor and to a device comprising the touch sensitive user interface. Finally, the present application relates to methods for operating the force sensitive touch sensor.

BACKGROUND OF THE INVENTION

Touch sensors are known in the art for controlling devices via a user interface or a man machine interface. Traditionally, touch sensors are adapted to detect a touch position in a two-dimensional way. Especially consumer products, for example mobile telephones, mobile navigation systems, mobile gaming devices and mobile media players, are looking for new input methods for utilizing more complex applications. Therefore, the third dimension for input purposes is utilized. Utilizing the third dimension can be realized for example by sensing a force being applied by user on a touch panel in a direction perpendicular to the plane of the touch panel. Thus, the first and the second dimensions are sensed by a touch position on the touch panel and the third dimension is sensed by the force being applied at the touch position.

For example, WO 2010/091744 A1 discloses a sensor, a display including a sensor, and method for using a sensor. The sensor comprises a membrane including a pattern of electrically conductive material. Furthermore, the sensor comprises a capacitance measuring unit configured to detect the presence of a finger, hand, or other object on the sensor or in the vicinity thereof. Furthermore, the sensor comprises a resistance measuring unit configured to detect whether a force is exerted by the finger, hand or other object on the sensor. The electrically conductive material comprises indium tin oxide (ITO) as it provides a piezoresistive property and is conducting and transparent. However, it may be brittle and may crack and is furthermore expensive due to the cost of indium.

Furthermore, on a front side of many consumer products comprising a touch sensitive surface, a lot of components should be grouped together, for example a camera, a loudspeaker, an ambient light sensor, a proximity sensor and so on. This may disturb a clean design of the front side of the consumer product, especially when these components are to be integrated in a mobile phone.

Therefore, there is a need to provide a more robust and cost efficient sensor to be used at for example a front side of a consumer product, especially a mobile phone.

SUMMARY OF THE INVENTION

According to the present invention, this object is achieved by a sensor as defined in claim 1, a display as defined in claim 6, a method as defined in claim 7, a method as defined in any one of claims 9-12, a touch sensitive user interface as defined in claim 13 and a device as defined in claim 15. The dependent claims define preferred and advantageous embodiments of the invention.

According to an aspect of the present invention, a sensor comprising an insulating support layer and an electrically conductive sensor structure is provided. The electrically conductive sensor structure comprises a piezoresistive material and is configured to provide the resistance varying in response to a force being applied to the insulating support layer. The piezoresistive material comprises graphene. Graphene is an electrically conductive material and is extremely durable. Furthermore, as graphene is based on carbon, no expensive raw material is needed for producing graphene. Graphene is essentially an isolated atomic plane of graphite. Moreover, graphene is a very strong material, even stronger than diamond. It provides a very good heat transfer and a very high electric conductance, one million times higher than copper. Furthermore, due to the isolated atomic plane, it is very thin and at the same time more elastic than a crystalline material. At the same time graphene provides a high transparency or opacity, for example, an atomic monolayer absorbs only 2.3 percent of white light. Graphene has furthermore piezoresistive properties. This allows to create very sensitive force sensors and sensor dimensions can be made very small with the same performance compared to conventional sensors, for example sensors based on indium tin oxide. The low resistance of graphene may significantly lower the noise of the sensor compared to other types of strain gauge sensors. Therefore, by using graphene in the above-described force sensor a more robust sensor can be provided and cost and space may be saved.

According to an embodiment, the electrically conductive sensor structure comprising the graphene is further configured to provide a capacitance varying in response to a change in its surrounding environment. Therefore, the electrically conductive sensor structure is adapted to detect a force applied to the insulating support layer and a capacitance change in the vicinity of the sensor, for example due to the presence of a finger, a hand or another object on the sensor.

According to another embodiment, the electrically conductive sensor structure is further configured to provide an electrical property varying in response to light incidence on the graphene. For example, the electrically conductive sensor structure may comprise a metal-graphene-metal photo detector allowing an efficient photo detection. Due to the band structure of graphene, a photoresponsivity may be achieved. Therefore, an electrical property of the electrically conductive sensor structure may vary in response to light incidence on the graphene, for example an electrical current may be generated by the graphene or by the metal-graphene-metal arrangement in response to light incidence. Therefore, a photosensitive sensor may be integrated into the force sensor and may simplify a mechanical design of for example a mobile phone. Furthermore, a cleaned-up design of a front surface of the mobile phone may be achieved.

According to another embodiment, the sensor may comprise an optical filter configured to pass at least visible light, ultraviolet light, or infrared light to the electrically conductive sensor structure. Graphene-based photo detectors may provide an operational wavelength range spanning 300 nm to 6 µm and possibly beyond. Therefore, by using optical filters the photoresponsive range may be restricted to a range as it is required by a specific application.

According to a further embodiment, the electrically conductive sensor structure comprises an array of graphene structures. Each graphene structure is configured to provide an electrical property varying in response to light incidence on the graphene structure. Thus, complex optical signals received by the array of graphene structures may be determined, for example for scanning a barcode, capturing images or detecting gestures of a finger or hand in the vicinity of the sensor.

According to another aspect of the present invention, a display comprising the sensor described above is provided. The insulating support layer comprises a window layer of the display. Furthermore, the insulating support layer may comprise a flexible layer arranged below the window layer of the display. Due to the transparency of the graphene, the sensor may be arranged in an upper side of a display, for example a liquid crystal display (LCD), without disturbing an optical output of the display.

According to another aspect of the present invention, a method of using the above-described sensor is provided. According to the method, a touch position of a user touching the sensor is determined based on the capacitance which varies in response to a change in a surrounding environment of the electrically conductive sensor structure, and a touch force of the user touching the sensor is determined based on the resistance and the touch position. The insulating support layer may provide different resiliences at different positions. Therefore, the resistance varying in response to a force being applied to the insulating support layer may vary differently depending on the touch position. Therefore, considering not only the resistance changing in response to the force, but also considering the touch position, the touch force can be calibrated.

According to a further embodiment, for calibrating the sensor, a plurality of touches are performed and corresponding resistances are measured. Each touch has a predetermined force at a predetermined touch position. The measured resistances and the associated predetermined forces and predetermined touch positions are e.g. stored in a calibration matrix or in another way calibrated, e.g. by an algorithm. Then, the touch force of the user touching the sensor is determined based on the determined resistance and touch position in connection with the calibration matrix. This may provide a more accurate force measurement based on the fact that it is known where the force is applied on the insulating support layer due to the capacitively sensed touch position. Depending on the needed accuracy, the calibration matrix may be setup for each individual sensor separately and stored for example in a driver circuit controlling the sensor. If a wider tolerance is acceptable, the calibration matrix may be setup once for all sensors.

According to an embodiment, a further method of using the above-described sensor is provided. According to this method, an intensity of ultraviolet light received by the electrically conductive sensor structure is determined and an information is output to a user in response to the determined intensity. This information may indicate for example how long a user may stay without sun protection in the sun without getting a sunburn. Furthermore, the information may indicate a dose of already received ultra-violet radiation within a predetermined previous range in time.

According to the further embodiment, the above-described sensor may be used to determine a distance to an object in an environment of the sensor. Therefore, predetermined infrared light is emitted to the object by an infrared transmitter. Infrared light reflected from the object is received by the electrically conductive sensor structure, and the distance to the object is determined based on the received infrared light. A distance measuring based on infrared light is known in the art and will therefore not be described in more detail here. In combination with an infrared transmitter, for example an infrared light emitting diode (LED) or a backlight illumination of a display, a distance measuring may be realized which may be integrated at low cost in for example a mobile phone without disturbing a clean design of a front side of the phone.

The infrared transmitter may be arranged below the sensor and may transmit the infrared light through the sensor due to the transparency of graphene.

According to a further embodiment, a method of using the above-described sensor comprising the array of graphene structures is provided. For each graphene structure an intensity of light received by the structure is determined and based on the determined light intensities a touch position of a user touching the sensor is determined.

This optical determination of the touch position may be used in combination with the capacitive determination of the touch position or may replace the capacitive determination.

A further method of using the above-described sensor comprising the array of graphene structures is provided. According to the method, for each graphene structure an intensity of light received by the structure is determined and an image of an environment is generated based on the determined light intensities. Thus, the sensor may be used as a scanner for scanning for example barcodes or a text of a document, or the sensor may be used as a camera for capturing images of a surrounding environment.

According to another aspect of the present invention, a touch sensitive user interface is provided. The touch sensitive user interface comprises the above-described sensor and a processing unit coupled to the electrically conductive sensor structure of the sensor. The processing unit is adapted to determine a force being applied by a user touching the sensor based on the varying resistance. The processing unit may furthermore be adapted to perform any one of the above-described methods. Therefore, a touch sensitive user interface is enabled for inputting comprehensive and complex control information in an easy and intuitive way. Furthermore, the touch sensitive user interface is robust and does not comprise expensive materials.

According to another aspect of the present invention a device comprising the above-described touch sensitive user interface is provided. The device comprises for example a mobile phone, a personal digital assistant, a mobile music player or a navigation system.

Although specific features described in the above summary and the following detailed description are described in connection with specific embodiments and aspects, it is to be understood that the features of the embodiments and aspects may be combined with each other unless specifically noted otherwise.

BRIEF DESCRIPTION OF THE DRAWINGS

The invention will now be described in more detail with reference to the accompanying drawings.

DETAILED DESCRIPTION OF PREFERRED EMBODIMENTS

In the following, exemplary embodiments of the present invention will be described in more detail. It has to be understood that the following description is given only for the purpose of illustrating the principles of the invention and is not be taken in a limiting sense. Rather, the scope of the invention is defined only by the appended claims and is not intended to be limited by the exemplary embodiments hereinafter.

It is to be understood that the features of the various exemplary embodiments described herein may be combined with each other unless specifically noted otherwise. Same reference signs in the various drawings and the following description refer to similar or identical components.

Figure 1:
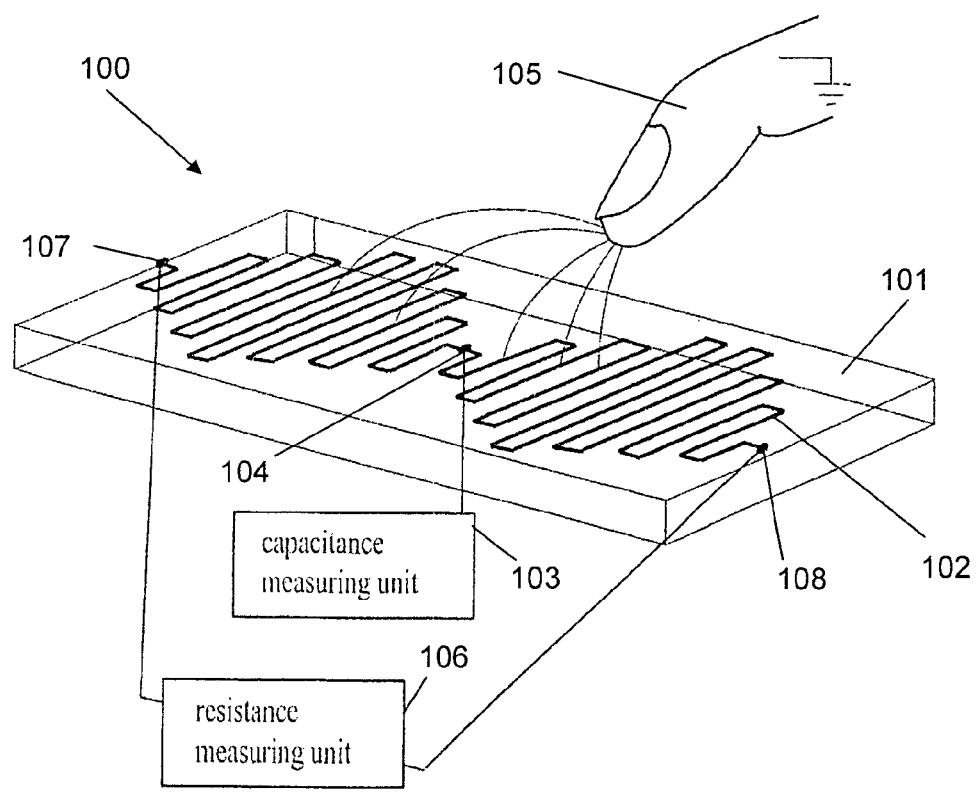
FIG. 1 schematically shows a sensor according to an embodiment of the present invention.

FIG. 1 shows a sensor 100 comprising an insulating support layer 101 and an electrically conductive sensor structure 102. The electrically conductive sensor structure 102 is arranged on an upper side of the insulating support layer 101. The electrically conductive sensor structure 102 may for example be laminated or coated or a surface of the insulating support layer 101 or may be comprised in or on a separate layer, for example a (not shown) membrane, which is arranged on the surface of the insulating support layer 101. The separate layer may comprise for example a window layer of a display, for example a liquid crystal display (LCD), on which the sensor 100 is located. Furthermore, the electrically conductive sensor structure 102 may be arranged at a lower side of the insulating support layer 101 and the insulating support layer 101 may be used as window layer of a liquid crystal display arranged below the insulating support layer 101. The electrically conductive sensor structure 102 is made of or comprises graphene.

Graphene is an electric conducting material and is extremely durable. Graphene may be produced cost efficient as it does not use any exotic materials like indium. Graphene is essentially an isolated atomic plane of graphite. It is a very strong material, stronger than diamond. It provides a very good heat transfer and a high electric conductivity, much higher than copper. Due to the isolated atomic plane very thin layers may be produced. Furthermore, it is very elastic. Finally, graphene provides a high opacity which absorbs only about 2.3 percent of white light. Therefore, a display arranged below the electrically conductive sensor structure 102 of graphene may be clearly visible.

The sensor 100 is coupled to a capacitance measuring unit 103 configured for measuring a capacitance between the pattern of the electrically conductive sensor structure 102 and its surrounding environment. The capacitance measuring unit 103 is connected to the graphene pattern 102 through a contact point 104. The surrounding environment may include a finger 105, a hand or another object which may modify the capacitance measured by the capacitance measuring unit 103, when active.

The sensor 100 is further coupled to a resistance measuring unit 106 configured for measuring the resistance between a pair of points 107, 108 of the graphene pattern 102. Graphene has good piezoresistive properties. The piezoresistive property describes the changing electrical resistance of a material due to applied mechanical stress. Therefore, when a pressure is applied by the finger 105 or a hand or another object on the insulating support layer 102, the insulating support layer 102 is deformed together with the electrically conductive sensor structure 102 which results in a change of resistance of the resistance measured between points 107 and 108. This change in resistance is measured by the resistance measuring unit 106, so that an exerted force can be detected and the exerted force can further be estimated.

Figure 2:
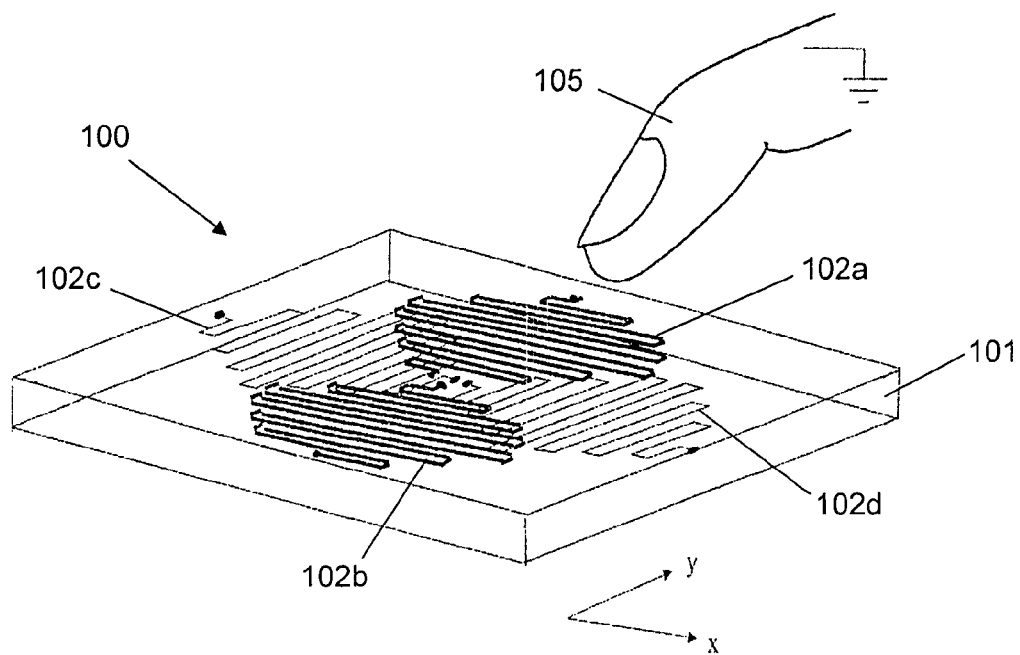
FIG. 2 schematically shows a sensor according to another embodiment of the present invention which provides a multilayered electrically conductive sensor structure.

FIG. 2 shows a sensor 100 according to another embodiment. The electrically conductive sensor structure 102 is arranged in two layers, an upper layer 102a, 102b and a lower layer 102c, 102d. The electrically conductive sensor structure of the upper and lower layers are made of graphene. The upper layer includes a first graphene pattern portion 102a and a second graphene pattern portion 102b. The lower layer includes a third graphene pattern portion 102c and a fourth graphene pattern portion 102d. Capacitance measuring units (not illustrated in FIG. 2) are provided to measure the capacitance between each graphene pattern portion 102a, 102b, 102c, 102d and their respective surrounding environment, for example the finger 105. Resistance measuring units (not illustrated in FIG. 2) are provided to measure the resistance between the contact points of each graphene pattern portion in order to detect a force and/or estimate force exerted by a finger 105 on the electrically conductive sensor structure or the insulating support layer 101 in the region of the corresponding graphene pattern portion 102a, 102b, 102c and 102d.

The capacitance measuring units electrically connected to each of the graphene pattern portions 102a, 102b may provide an indication of the position of the finger 105 on the insulating support layer 101 in the x direction, as indicated in FIG. 2. The capacitance measuring units electrically connected to each of the graphene pattern portions 102c, 102d may provide an indication of the position of the finger 105 in the y direction.

The electrically conductive sensor structure 102 may comprise more than two layers and more than two portions in each layer. The graphene pattern portions may be in the form a serpentine as shown in FIG. 2 or in any other form.

The graphene pattern portions may be printed on the same side of the insulating support layer 101 or directly on a window layer of a display. In this case there may be some insulating material in between the layered graphene pattern portions. Furthermore, separate graphene pattern portions may be used for capacitive touch sensing and for force sensing.

Figure 3:
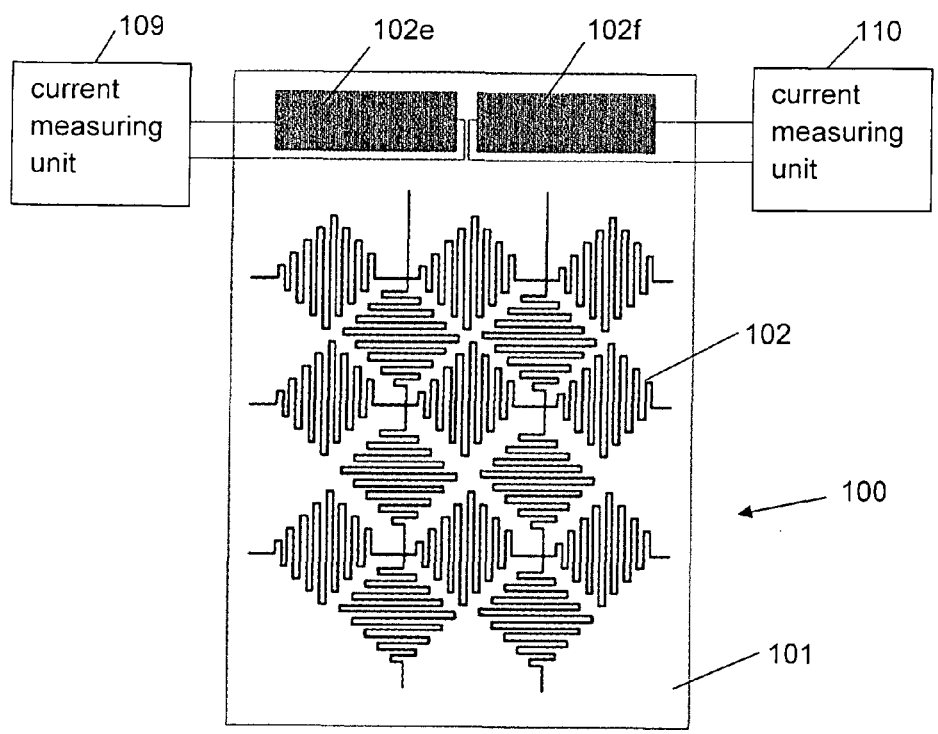
FIG. 3 schematically shows a top view of a sensor according to a further embodiment comprising photoresponsive areas in the electrically conductive sensor structure.

FIG. 3 shows a sensor 100 according to a further embodiment. The sensor 100 comprises an insulating support layer 101 and an electrically conductive sensor structure 102 comprising graphene and being arranged in two layers as shown in FIG. 2. Each of the two layers comprises a plurality of graphene pattern portions as described in connection with FIG. 2. The electrically conductive sensor structure 102 comprises furthermore a first optical sensor field 102e and a second optical sensor field 102f. The optical sensor fields 102e, 102f comprise graphene. Apart from its electrically conductivity and piezoresistive properties, graphene provides a photoresponsivity at a large wavelength range spanning 300 nm to 6000 nm and possibly beyond. For example, graphene may be arranged in a layered structure made of metal, graphene and metal and forming a photo detector providing an electrical current in response to light incidence on the graphene. Each of the optical sensor fields 102e, 102f is connected to corresponding current measuring units 109, 110. Thus, a current corresponding to light incidence on the graphene may be measured and used for example to determine an ambient light around the sensor 100, or may be used for scanning or image capturing. Furthermore, optical filters may be provided to achieve photoresponsivity in the wanted spectral range. For example, an ultraviolet filter may be provided for measuring an intensity of ultraviolet light incidence on the graphene for using the sensor 100 as an ultraviolet dosimeter, or an infrared light filter may be provided for receiving infrared light only, for example for a distance measuring.

Figure 4:
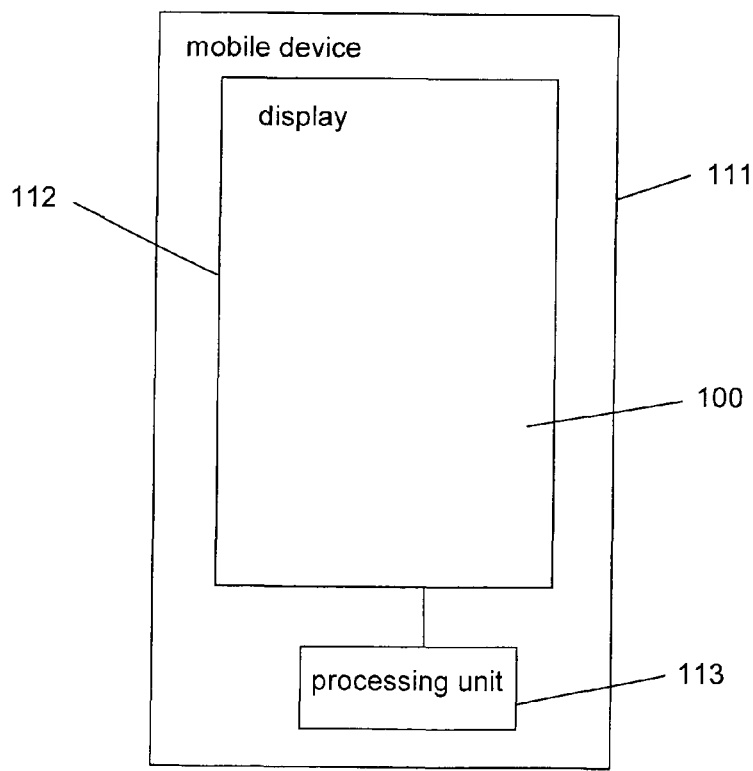
FIG. 4 schematically shows a mobile device according to an embodiment of the present invention.

FIG. 4 shows a mobile device 111 comprising a display 112 and the above-described sensor 100 arranged above the display. The sensor 100 and the display 112 are coupled to a processing unit 113 of the mobile device 111. Due to the high opacity of the graphene, the electrically conductive sensor structure of the sensor 100 does not significantly influence an optical output of the display 112. Furthermore, as the electrically conductive sensor structure comprising graphene is adapted to determine a touch position, a force applied on the sensor 100 and an optical sensing, a clean design of the front side of the mobile device 111 may be achieved.

While exemplary embodiments have been described above, various modifications may be implemented in other embodiments. For example, the optical sensor fields may be arranged over a wide area of the sensor 100 between and in combination with the graphene pattern portions 102a-102d such that an array of optical sensor fields is formed over the surface of the sensor 100. This optical sensor field array may be adapted to scan barcodes or text or may be adapted for capturing images of an environment of the sensor 100.

Finally, it is to be understood that all the embodiments described above are considered to be comprised by the present invention as it is defined by the appended claims.

The invention claimed is:

1. A method of using a sensor, the sensor comprising an insulating support layer and an electrically conductive sensor structure,
   wherein the electrically conductive sensor structure comprises a piezoresistive material and is configured to provide a resistance varying in response to a force being applied to the insulating support layer,
   wherein the piezoresistive material comprises graphene, and
   wherein the electrically conductive sensor structure comprises an array of graphene structures, each graphene structure being configured to provide an electrical property varying in response to light incidence on the graphene, the method comprising:
       determining for each graphene structure an intensity of light received by the electrically conductive sensor structure, and
       determining a touch position of a user touching the sensor based on the determined light intensities.

2. The method according to claim 1, wherein the electrically conductive sensor structure is further configured to provide a capacitance varying in response to a change in its surrounding environment.

3. The method according to claim 1, wherein the sensor comprises an optical filter configured to pass at least one of:
   visible light,
   ultraviolet light, or
   infrared light
to the electrically conductive sensor structure.

4. The method according to claim 2, comprising:
   determining a touch position of a user touching the sensor based on the capacitance, and
   determining a touch force applied by the user touching the sensor based on the resistance and the touch position.

5. The method according to claim 4,
   measuring resistances for a plurality of touches, each touch having a predetermined force at a predetermined touch position, and
   storing the measured resistances and the associated predetermined forces and predetermined touch positions in a calibration matrix,
wherein the step of determining the touch force applied by the user touching the sensor comprises determining the touch force applied by the user touching the sensor based on the resistance, the touch position, and the calibration matrix.

6. The method according to claim 1, comprising:
   determining an intensity of ultraviolet light received by the electrically conductive sensor structure, and
   outputting an information to a user in response to the determined intensity.

7. The method according to claim 1, comprising:
   emitting predetermined infrared light to an object in an environment of the sensor by an infrared transmitter,
   receiving infrared light reflected from the object by the electrically conductive sensor structure, and
   determining a distance to the object based on the received infrared light.

8. The method according to claim 1, comprising:
   determining for each graphene structure an intensity of light received by the electrically conductive sensor structure, and
   generating an image of an environment based on the determined light intensities.

9. A touch sensitive user interface, comprising:
   a sensor, and
   a processing unit,
   wherein the sensor comprises an insulating support layer and an electrically conductive sensor structure,
   wherein the electrically conductive sensor structure comprises a piezoresistive material and is configured to provide a resistance varying in response to a force being applied to the insulating support layer,
   wherein the piezoresistive material comprises graphene, and
   wherein the electrically conductive sensor structure comprises an array of graphene structures, each graphene structure being configured to provide an electrical property varying in response to light incidence on the graphene,
   wherein the processing unit is coupled to the electrically conductive sensor structure of the sensor and adapted to
   determine a force being applied by a user touching the sensor based on the varying resistance,
   determine for each graphene structure an intensity of light received by the electrically conductive sensor structure, and
   determine a touch position of a user touching the sensor based on the determined light intensities.

10. The touch sensitive user interface according to claim 9, wherein the touch sensitive user interface is arranged in at least one device of a group consisting of a mobile phone, a personal digital assistant, a mobile music player, and a navigation system.

* * * * *